United States Patent [19]
Mullin et al.

[11] Patent Number: 5,999,626
[45] Date of Patent: Dec. 7, 1999

[54] DIGITAL SIGNATURES ON A SMARTCARD

[75] Inventors: Ronald C. Mullin; Scott A. Vanstone, both of Waterloo, Canada

[73] Assignee: Certicom Corp., Canada

[21] Appl. No.: 08/632,845

[22] Filed: Apr. 16, 1996

[51] Int. Cl.⁶ .................................. H04L 9/00; H04L 9/30
[52] U.S. Cl. .................................. 380/25; 380/23; 380/30; 380/49
[58] Field of Search .................................. 380/4, 23, 24, 380/25, 30, 49, 50, 29

[56] References Cited

U.S. PATENT DOCUMENTS

| | | | |
|---|---|---|---|
| 5,146,500 | 9/1992 | Maurer | 380/30 |
| 5,159,632 | 10/1992 | Crandall | 380/30 X |
| 5,271,061 | 12/1993 | Crandall | 380/30 X |
| 5,272,755 | 12/1993 | Miyaji et al. | 380/30 |
| 5,351,297 | 9/1994 | Miyaji et al. | 380/30 X |
| 5,442,707 | 8/1995 | Miyaji et al. | 380/30 |
| 5,463,690 | 10/1995 | Crandall | 380/30 |
| 5,497,423 | 3/1996 | Miyaji | 380/30 |

OTHER PUBLICATIONS

Evangelos Kranakis, "Primality and Cryptography"; (John Wiley & Sons; New York; 1986); pp. 98–99.

*Primary Examiner*—Bernarr E. Gregory
*Attorney, Agent, or Firm*—Baker & Maxham

[57] ABSTRACT

A digital signature scheme for a "smart" card utilizes a set of prestored signing elements and combines pairs of the elements to produce a new session pair. The combination of the elements is performed partly on the card and partly on the associated transaction device so that the exchange of information between card and device does not disclose the identity of the signing elements. The signing elements are selected in a deterministic but unpredictable manner so that each pair of elements is used once. Further signing pairs are generated by implementing the signing over an anomalous elliptic curve encryption scheme and applying a Frobenius Operator to the normal basis representation of one of the elements.

12 Claims, 5 Drawing Sheets

DIGITAL SIGNATURES ON A SMARTCARD

The present invention relates to methods and apparatus for generating digital signatures.

It has become widely accepted to conduct transactions, such as financial transactions or exchange of documents, electronically. In order to verify the transaction, it is also well-known to "sign" the transaction digitally so that the authenticity of the transaction can be verified. The signature is performed according to a protocol that utilizes the message, i.e. the transaction, and a secret key associated with the party. The recipient can verify the signature using a public key of the signing party to recover the message and compare it with the transmitted message. Any attempt to tamper with the message or to use a key other than that of the signing party will result in an incompatibility between the sent message and that recovered from the signature or will fail to identify the party correctly and thereby lead to rejection of the transaction.

The signature must be performed such that the signing party's secret key cannot be determined. To avoid the complexity of distributing secret keys, it is convenient to utilize a public key encryption scheme in the generation of the signature. Such capabilities are available where the transaction is conducted between parties having access to relatively large computing resources but it is equally important to facilitate such transactions at an individual level where more limited computing resources are available.

Automated teller machines (ATMs) and credit cards are widely used for personal transactions and as their use expands, so the need to verify such transactions increases. Transaction cards, i.e. credit/debit cards or pass cards are now available with limited computing capacity (so-called "Smart Cards") but these do not have sufficient computing capacity to implement existing digital signature protocols in a commercially viable manner.

As noted above, in order to generate a digital signature, it is necessary to utilize a public key encryption scheme. Most public key schemes are based on the Diffie Helman Public key protocol and a particularly popular implementation is that known as DSS. The DSS scheme utilizes the set of integers Zp where p is a large prime. For adequate security, p must be in the order of 512 bits although the resultant signature may be reduced mod q, where q divides p-1, and may be in the order of 160 bits.

The DSS protocol provides a signature composed of two components r, s. The protocol requires the selection of a secret random integer k referred to as the session key from the set of integers (0, 1, 2, . . . q-1), i.e.

$k \in \{0, 1, 2, \ldots q\text{-}1\}$.

The component r is then computed such that $r = \{\beta^k \bmod p\} \bmod q$ where $\beta$ is a generator of q.
The component s is computed as $s = [k^{-1}(h(m)) + ar] \bmod q$ where m is the message to be transmitted,
h(m) is a hash of that message, and
a is the private key of the user.

The signature associated with the message is then s,r which may be used to verify the origin of the message from the public key of the user.

The value $\beta^k$ is computationally difficult for the DSS implementation as the exponentiation requires multiple multiplications mod p. This is beyond the capabilities of a "Smart Card" in a commercially acceptable time. Although the computation could be completed on the associated ATM, this would require the disclosure of the session key k to the ATM and therefore render the private key, a, vulnerable.

It has been proposed to precompute $\beta^k$ and store sets of values of r and k on the card. The generation of the signature then only requires two 160 bit multiplications and signing can be completed within ½ second for typical applications. However, the number of sets of values stored limits the number of uses of the card before either reloading or replacement is required. A problem that exists therefore is how to generate sufficient sets of values within the storage and/or computing capacity of the card.

One possibility is to use a smaller value of p but with the DSS scheme this will jeopardize the security of the transaction.

An alternative encryption scheme that provides enhanced security at relatively small modulus is that utilizing elliptic curves in the finite field $2^m$. A value of m in the order of 155 provides security comparable to a 512 bit modulus for DSS and therefore offers significant benefits in implementation.

Diffie Helman Public Key encryption utilizes the properties of discrete logs so that even if a generator $\beta$ and the exponentiation $\beta^k$ is known, the value of k cannot be determined. A similar property exists with elliptic curves where the addition of two points on a curve produces a third point on the curve. Similarly, multiplying any point on the curve by an integer k produces a further point on the curve. However, knowing the starting point and the end point does not reveal the value of the integer 'k' which may then be used as a session key for encryption. The value kP, where P is an initial known point, is therefore equivalent to the exponentiation $\beta^k$.

In order to perform a digital signature on an elliptic curve, it is necessary to have available the session key k and a value of kP referred to as a "session pair". Each signature utilizes a different session pair k and kP and although the representation of k and kP is relatively small compared with DSS implementations, the practical limits for "Smart Cards" are in the order of 32 signatures. This is not sufficient for commercial purposes.

One solution for both DSS and elliptic curve implementations is to store pairs of signing elements k, kP and combine stored pairs to produce a new session pair. For an elliptic curve application, this would yield a possible 500 session pairs from an initial group of 32 stored signing elements. The possibilities would be more limited when using DSS because of the smaller group of signing elements that could be stored.

In order to compute a new session pair, k and kP, from a pair of stored signing elements, it is necessary to add the values of k, e.g. $k_1 + k_2 \rightarrow k$ and the values of $k_1P$ and $k_2P$ to give a new value kP. In an elliptic curve, the addition of two points to provide a third point is performed according to set formula such that the addition of a point $k_1P$ having coordinates (x,y) and a point $k_1P$ having coordinates $(x_2, y_2)$ provides a point $k_3P$ whose x coordinate $x_3$ is given by:

$$x_3 = \frac{y_1 \oplus y_2^2}{x_1 \oplus x_2} \oplus \frac{y_1 \oplus y_2}{x_1 \oplus x_2} \oplus x_1 \oplus x_2.$$

This computation may be significantly simplified using the normal basis representation in a field $F2^m$, as set out more fully in our PCT application Ser. No. PCT/CA95/00452, the contents of which are incorporated herein by reference. However, even using such advantageous techniques, it is still necessary to utilize a finite field multiplier and provide sufficient space for code to perform the computation. This is not feasible within the practical limits of available "Smart" cards.

As noted above, the ATM used in association with the card has sufficient computing power to perform the computation but the transfer of the coordinates of $k_1P$ and $k_2P$ from the card to the terminal would jeopardize the integrity of subsequent digital signatures as two of the stored signing elements would be known.

It is therefore an object of the present invention to obviate or mitigate the above disadvantages and facilitate the preparation of additional pairs of values from a previously stored set.

In general terms, one aspect of the present invention proposes to compute on one computing device an initial step in the computation of a coordinate of a point derived from a pair of points to inhibit recognition of the individual components, transfer such information to another computing device remote from said one device, perform at least such additional steps in said derivation at such other device to permit the completion of the derivation at said one device and transfer the result thereof to said one computing device.

Preferably, the initial step involves a simple field operation on the two sets of coordinates which provides information required in the subsequent steps of the derivation.

Preferably also the additional steps performed at the other device complete the derivation.

In a preferred embodiment, the initial step involves the addition of the x coordinates and the addition y coordinates to provide the terms $(x_1 \oplus x_2)$ and $(y_1 \oplus y_2)$.

The addition of the coordinates is an XOR operation that can readily be performed on the card and the results provided to the terminal.

In this manner, the coordinates (x,y) representing kP in a stored signing element are not disclosed as insufficient information is provided even with subsequent uses of the card. Accordingly, the x coordinate of up to 500 signatures can be generated from an initial set of 32 stored signing elements.

The new value of k can be computed on the card and to avoid computing the inverse $k^{-1}$, alternative known masking techniques can be utilized.

A further aspect of the present invention provides a method of generating additional sets of points from the initial set that may be used individually as a new value of kP or in combination to generate still further values of kP.

According to this aspect of the invention, the curve is an anomalous curve and the Frobenius Operator is applied to at least one of the coordinates representing a point in the initial set to provide a coordinate of a further point on the elliptic curve. The Frobenius Operator Ø provides that for a point $(x_1,y_1)$ on an anomalous curve, then Ø $(x_1,y_1)$ is a point $(x_1^2,y_1^2)$ that also lies on the curve. In general, $Ø^i(x_1 y_1)$ is a point $x_1^{2^i}$, $y_1^{2^i}$ that also lies on the curve. For a curve over the field $2^m$, there are m Frobenius Operators so for each value of kP stored in the initial set, m values of kP may be generated, referred to as "derived" values. The new value of k associated with each point can be derived from the initial relationship between P and ØP and the initial value of k.

For a practical implementation where 32 pairs of signing elements are initially retained on the card and the curve is over the field $2^{155}$, utilizing the Frobenius Operator provides in the order of 4960 possible derived values and by combining pairs of such derived values as above in the order of $10^7$ values of kP can be obtained from the initial 32 stored signing elements and the corresponding values of k obtained to provide $10^7$ session pairs.

Preferably, the stored values of kP are in a normal basis representation. The application Frobenius Operator then simply requires an "i" fold cyclic shift to obtain the value for an $Ø^i$ operation.

According to a further aspect of the invention, there is provided a method of generating signature components for use in a digital signature scheme, said signature components including private information and a public key derived from said private information, said method comprising the steps of storing private information and related public key as an element in a set of such information, cycling in a deterministic but unpredictable fashion through said set to select at least one element of said set without repetition and utilizing said one element to derive a signature component in said digital signature scheme.

BRIEF DESCRIPTION OF THE DRAWINGS

Embodiments of the invention will now be described by way of example only with reference to the accompanying drawings, in which.

The System

Figure 1:
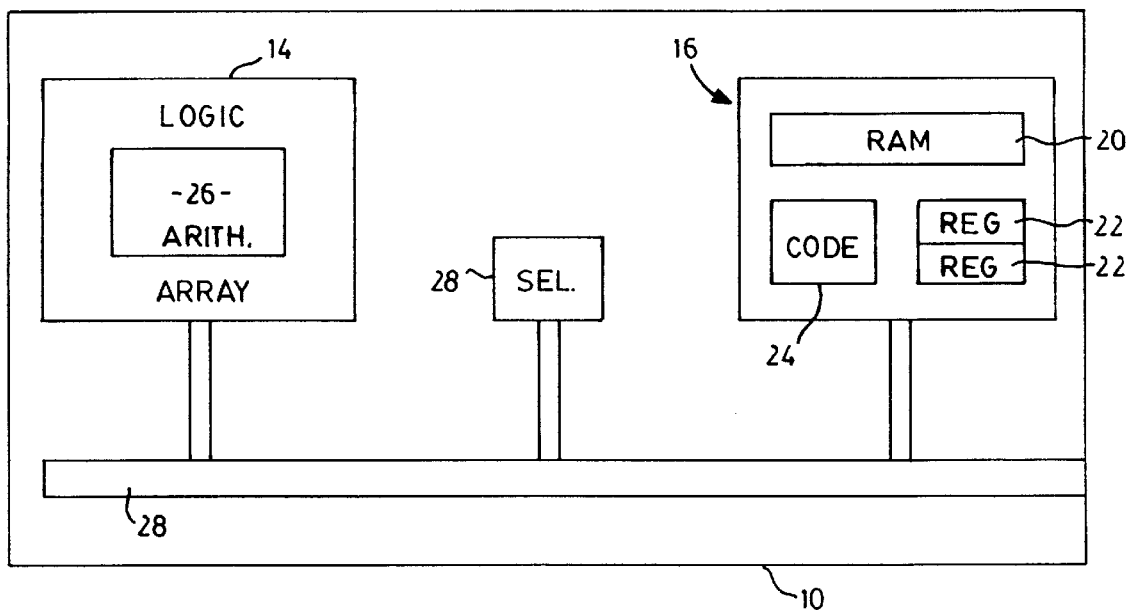
FIG. 1 is a schematic representation of a programmable credit card.
Figure 2:
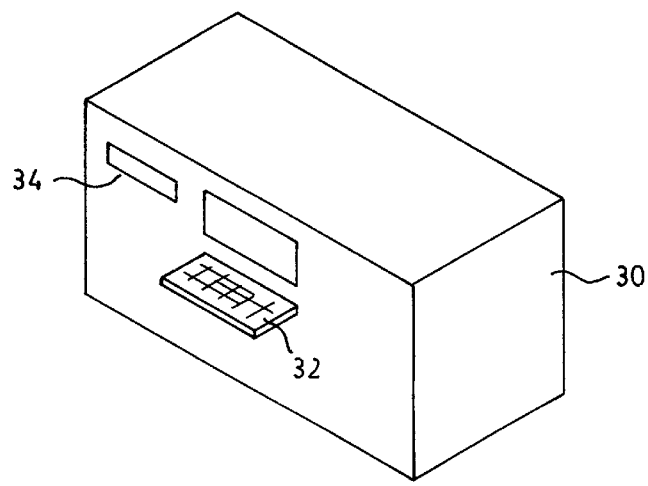
FIG. 2 is a schematic representation of a transaction performed between the card and network.

Referring therefore to FIG. 1, a programmable credit card 10 (referred to as a 'SMART' card) has an integrated circuit 12 embedded within the body of card 10.

The integrated circuit includes a logic array 14, an addressable memory 16 and a communication bus 18. The memory 16 includes a RAM section 20 to store information, a pair of cyclic shift registers 22 for temporary storage of information and programming code 24 for control of the logic array 14 and communication bus 18. The array 14 includes an arithmetic unit 26 to provide modular arithmetic operation, e.g. additional and multiplication, and a selection unit 28 controlled by the programming code 24. It will be appreciated that the description of the card 10 is a schematic and restricted to that necessary for explanation of the preferred embodiment of the invention.

The card 10 is used in conjunction with a terminal 30, for example an automated teller machine (ATM), that is connected to a network to allow financial transactions to be conducted. The terminal 30 includes a keypad 32 to select options and tasks and has computing capabilities to perform the necessary functions in conjunction with the card 10.

Access to the terminal 30 is obtained by inserting card 10 into a reader 34 and entering a pass code in a conventional manner. The pass code is verified with the card 10 through communication bus 18 and the terminal 30 activated. The keypad 32 is used to select a transaction, for example a transfer of funds, between accounts and generate a message through the network to give effect to the transactions, and card 10 is used to sign that transaction to indicate its authenticity. The signature and message are transmitted over the network to the intended recipient and upon receipt and verification, the transaction is completed.

The Card

The RAM section 20 of memory 16 includes digital data string representing a private key, a, which remains secret with the owner of the card and a corresponding public key Q=aP where P is the publicly known initial point on the selected curve. The RAM section 20 also includes a predetermined set of coordinates of points, kP, on an elliptic curve that has been preselected for use in a public key encryption scheme. It is preferred that the curve is over a finite field $2^m$, conveniently, and by way of example only, $2^{155}$, and that the points kP are represented in normal basis representation. The selected curve should be an anomalous curve, e.g. a curve that satisfies $y^2+xy=x^3+1$, and has an order, e. Each point kP has an x coordinate and a y coordinate and is thus represented as two 155 digital data strings that are stored in the RAM 20. By way of example, it will be assumed that the RAM 20 contains 32 such points identified generically as kP and individually as $k_0P$, $k_1P$ . . . $k_{31}P$. Similarly, their coordinates (x,y) will be individually designated $x_0y_0$ . . . $x_{31}y_{31}$.

The points kP are precomputed from the chosen parameters of the curve and the coordinates of an originating point P. The k-fold addition of point P will provide a further point kP on the curve, represented by its coordinates (x,y) and the value of k cannot be determined even if the coordinates of points P and kP are known.

RAM 20 therefore contains the values of k associated with the respective points kP so that a set of stored signing elements k,kP is available for use in the signing of the transaction.

Signing

To sign a message m generated by the transaction, one session pair $k_j$; $k_jP$ is required and may be obtained from RAM 20 as set out more fully below. Assuming that values $k_j$, $k_jP$ have been obtained, the signing protocol requires a signature r,s) where r is the data string representing the x-coordinate, $x_j$ reduced mod q (q is a preselected publicly known divisor of e, the order of the curve, i.e. $q/e_x$); and $s=[k^{-1}(h(m))+ar]$ mod q where h(m) is a q-bit hash of the message m generated by the transaction.

In this signature, even though r is known, s contains the secret k and the private key, a, and so inhibits the extraction of either.

The generation of s requires the inversion of the value k and since k is itself to be derived from the stored set of values of k, it is impractical to store corresponding inverted values of possible k's. Accordingly, a known masking technique is used to generate components r, $s^1$ and u of a signature. This is done by selecting an integer, c, and computing a value u=ck. The value $s^1$=c(h(m)+ar) mod q.

The signature value s can then be obtained by the recipient computing $s^1u^{-1}=k^{-1}[h(m)+ar]$.

The signature $(r,s^1,u)$ can be computed on the card 10 and forwarded by bus 18 to the terminal 30 for attachment to the message m.

Generation of Session Pair

As noted above, in order to generate the signature (r,s), it is necessary to have for session pair k and kP. Security dictates that each session pair is only used once and it is assumed that the number of signing elements stored in RAM 20 is insufficient for commercial application.

In the preferred embodiment, two techniques are used to generate additional session pairs to the stored signing elements. It will be appreciated that each technique may be used individually although the combination of the two is preferred.

(i) Frobenius Operator

Figure 3:
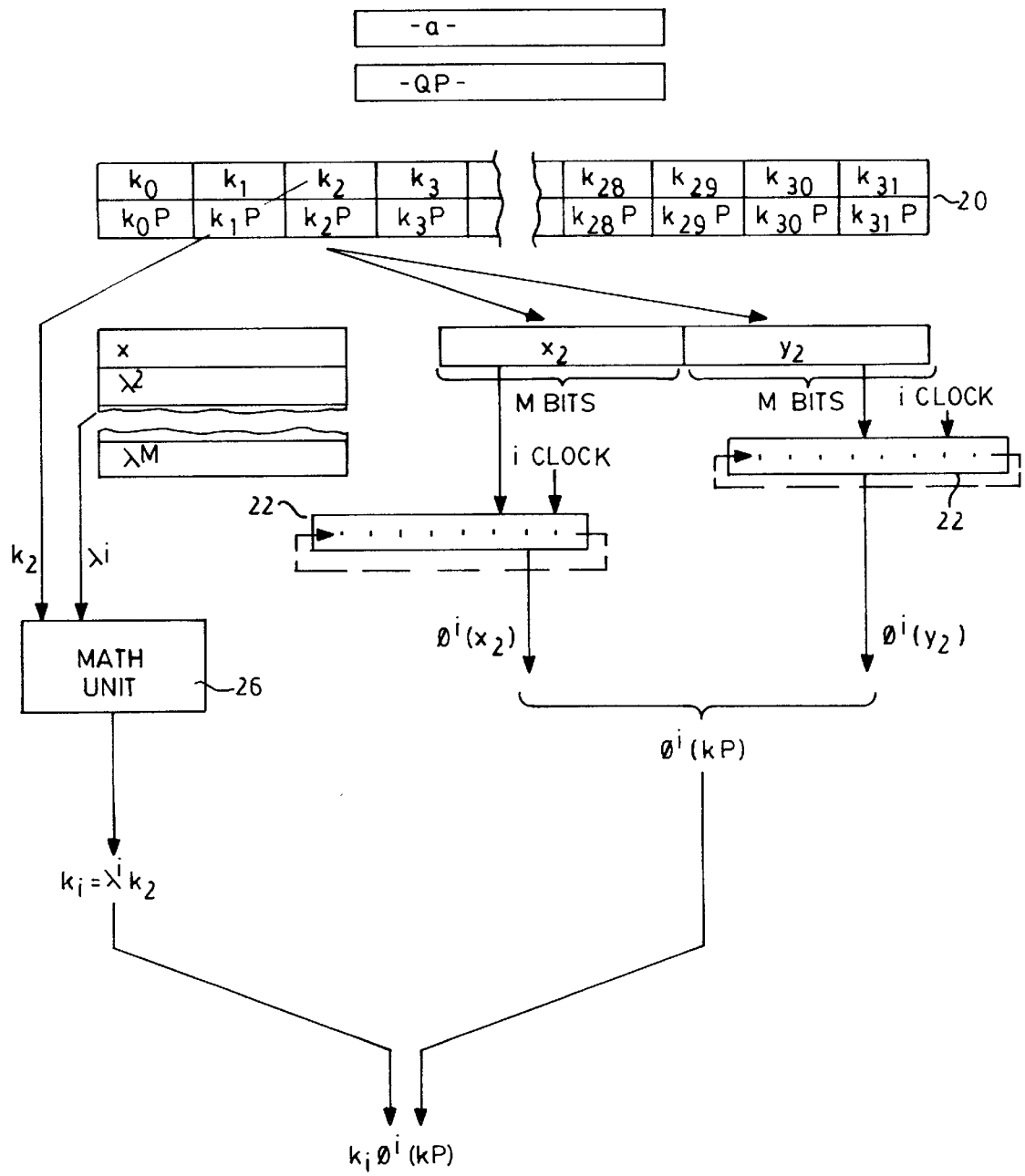
FIG. 3 is a schematic representation of the derivation of a session pair from a pair of stored signing elements.

The first technique involves the use of the Frobenius Operator to derive additional session pairs from the stored signing elements and is shown in FIG. 3. The Frobenius Operator denoted Ø operates on a point P having coordinates (x,y) on an anomalous elliptic curve in the finite field $2^m$ such that $Ø^iP=(x^{2^i},y^{2^i})$. Moreover, the point $Ø^iP$ is also on the curve. In the field $2^{155}$, there are 155 Frobenius Operators so each point kP stored in memory 20 may generate 155 points on the curve by application of the Frobenius Operators. Thus, for the 32 values of kP stored, there are 4960 possible values of kP available by application of the Frobenius Operator.

To derive the value of $Ø^iP$, it is simply necessary to load the x and y coordinates of a point kP into respective shift registers 22 and perform an i-fold cyclic shift. Because the coordinates (x,y) have a normal basis representation, a cyclic shift in the register 22 will perform a squaring operation, and an i-fold cyclic shift will raise the value to the power $2^i$. Therefore, after the application of i clock cycles, the registers 22 contain the coordinates of $Ø^i(kP)$ which is a point on the curve and may be used in the signing protocol. The 155 possible values of the coordinates (x,y) of $Ø^i(kP)$ may be obtained by simple cyclic shifting. The representations in the registers 22 may then be used to obtain r.

Where the use of Frobenius Operator provides sufficient values for commercial use, only one coordinate is needed to compute the value of r and so only a single shift register is needed. However, as will be described below, further session pairs can be derived if both the coordinates are known and so a pair of registers is provided.

For each value of $Ø^i(kP)$, it is necessary to obtain the corresponding value of $kØ(P)=\lambda P$. $\lambda$ is a constant that may be evaluated ahead of time and the values of its first m powers, $\lambda^i$ computed. The m values are stored in RAM 20.

In general, $Ø^i(kP) \to \lambda^i kP$ so the value of k associated with $Ø^i(kP)$ is $\lambda^i k$. Since k is stored for each value of kP in RAM 20 and $\lambda^i$ is also stored, the new value of k, i.e. $\lambda^i k$, can be computed using the arithmetic unit 26.

As an alternative, to facilitate efficient computation of $\lambda^i$ and avoid excessive storage, it is possible to precompute specific powers of $\lambda$ and store them in RAM 20. Because m is 155 in the specific example, the possible values of i can be represented as an 8-bit binary word. The values of $\lambda^2 \to \lambda^{2^7}$ are thus stored in RAM 20 and the value of $\lambda$ represented in binary. The prestored values of $\lambda^{2^i}$ are then retrieved as necessary and multiplied mod e by arithmetic unit 26 to provide the value of $\lambda^i$. This is then multiplied by k to obtain the new value associated with $Ø^i(kP)$.

It will be seen therefore that new session pairs k, kP may be derived simply and efficiently from the stored signing elements of the initial set. These session pairs may be computed in real time, thereby obviating the need to increase storage capacity and their computation utilizes simple arithmetic operations that may be implemented in arithmetic unit 26.

(ii) Combining Pairs

Figure 4:
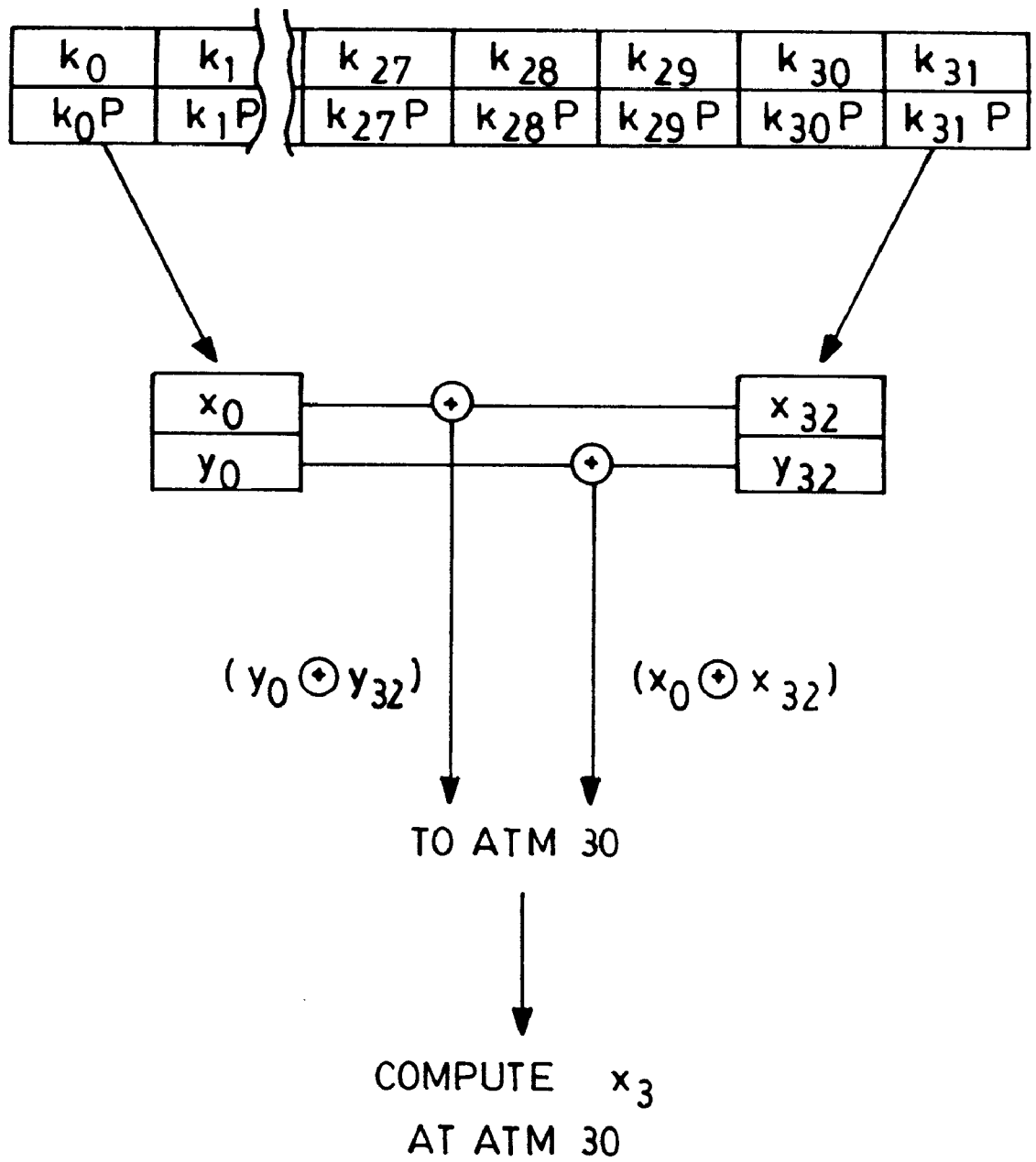
FIG. 4 is a schematic representation of one step in the transmission of information shown in FIG. 2.

A further technique, illustrated schematically in FIG. 4, to increase the number of session pairs of k and kP available, and thereby increase the number of signatures available from a card, is to combine pairs of stored signing elements to produce a new derived value. The addition of two points $k_1P$ and $k_2P$ will produce a third point $k_3P$ that also lies on the curve and may therefore be used for signatures.

The addition of two points having coordinates $(x_1,y_1)$ $(x_2,y_2)$ respectively on a curve produces a new point having an x coordinate $x_3$ where $$x_3 = \frac{y_1 \oplus y_2^2}{x_1 \oplus x_2} \oplus \frac{y_1 \oplus y_2}{x_1 \oplus x_2} \oplus x_1 \oplus x_2$$

In the finite field 2m, y1Øy2 and x1Øx2 is an XOR field operation that may be performed simply in logic array 16. Thus the respective values of $x_1,x_2$ and $y_1,y_2$ are placed in respective ones of registers 22 and XOR'd. The resultant data string is then passed over communication bus 16 to the terminal 30. The terminal 30 has sufficient computing capacity to perform the inversion, multiplication and summation to produce the value of $x_3$. This is then returned to register 22 for signature. The potential disclosure of $x_3$ does not jeopardize the security of the signature as the relevant portion is disclosed in the transmission of r.

The value of $k_1+k_2$ is obtained from the arithmetic unit 26 within logic array 16 to provide a value of $k_3$ and hence a new session pair $k_3$, $k_3P$ is available for signature.

It will be appreciated that the value for $y_3$ has not been computed as the signing value r is derived from $X_3$ rather than both coordinates.

It will be noted that the values of $x_1$ and $x_2$ or $y_1$ and $y_2$ are not transmitted to terminal 30 and provided a different pair of points is used for each signature, then the values of the coordinates remains undisclosed.

At the same time, the arithmetic functions performed on the card are relatively simple and those computationally more difficult are performed on the terminal 30.

Preferred Implementation of Generating Session Pairs

The above technique may of course be used with pairs selected directly from the stored signing elements or with the derived values obtained using the Frobenius Operator as described above. Alternatively, the Frobenius Operator could be applied to the value of kP obtained from combining pairs of the stored signing elements to provide m possible values of each derived value.

Figure 5:
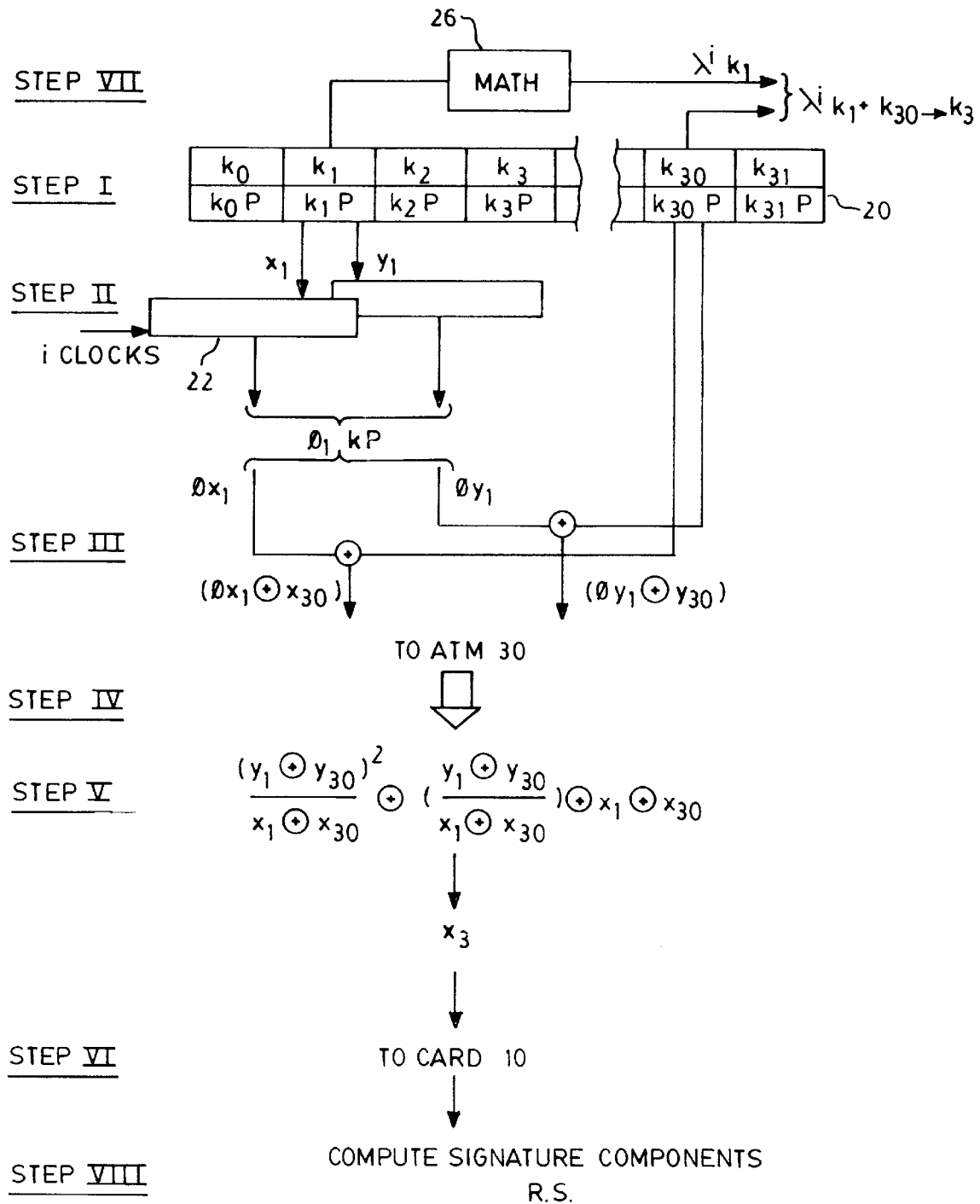
FIG. 5 is a schematic representation of a preferred implementation of the derivation of a session pair from two pairs of stored values.

To ensure security and avoid duplication of session pairs, it is preferred that only one of the stored signing elements should have the Frobenius Operator applied, as in the preferred embodiment illustrated in FIG. 5.

In this arrangement, the coordinates $x_1,y_1$ of one of the stored signing elements is applied to the registers 22 and cyclically shifted i times to provide $Ø^i k_1P$.

The respective coordinates, $x_{Ø1}, y_{Ø1}$, are XOR'd with the coordinates from another of the stored values $k_2P$ and the summed coordinates transmitted to ATM 30 for computation of the coordinate $x_3$. This is retransmitted to the card 10 for computation of the value r.

The value of $k_1$ is processed by arithmetic unit 26 to provide $\lambda^i k$ and added to $k_2$ to provide the new value $k_3$ for generation of signature component s. In this embodiment, from an original set of 32 stored signing elements stored on card 10, it is possible to generate in the order of $10^7$ session pairs. In practice, a limit of $10^6$ is realistic.

Selection of Pairs Stored Signing Elements

The above procedure requires a pair of stored signing elements to be used to generate each session pair. In order to preserve the integrity of the system, the same set cannot be used more than once and the pairs of stored values constituting the set must not be selected in a predictable manner.

Figure 6:
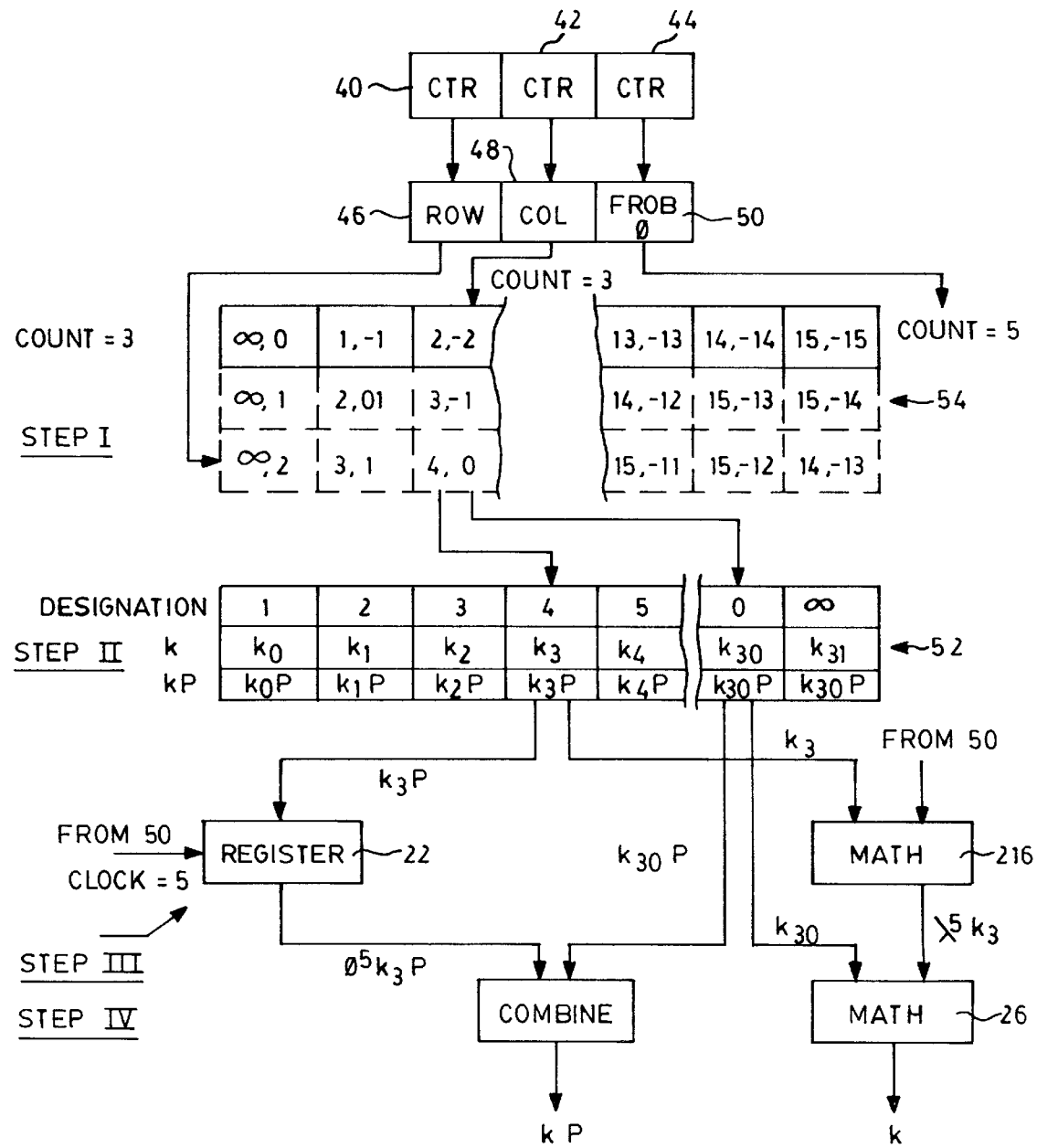
FIG. 6 is a schematic representation of a selection unit shown in FIG. 1.

This selection function is performed by the selection unit 28 whose operation is shown schematically in FIG. 6.

Selection unit 28 includes a set of counters 40,42,44 whose outputs address respective look up tables 46,48,50. The look up tables 46,48,50 map the successive outputs of the counters to pseudo random output values to provide unpredictability for the selection stored signing elements.

The 32 stored values of k and kP are assigned nominal designations as elements in a set 52 ranging from $-15$ to $+15$ with one designated $\infty$. To ensure that all available combinations of stored values are used without repetition, the nominal designations are grouped in 16 pairs in an ordered array 54 such that the difference (mod 31) in the assigned values of a pair uses all the numbers from 1 to 30. $\infty$ is grouped with 0. This array provides a first row of a notional matrix.

Successive rows 54$a,b,c,$ etc. of the notional matrix are developed by adding 1 to each assigned designation of the preceding row until 15 rows are developed. In this way a matrix is developed without repetition of the designations in each cell. By convention $\infty+1=\infty$.

Counter 42 will have a full count after 15 increments and counter 40 will have a full count after 14 increments. Provided the full count values of counters 40,42 are relatively prime and the possible values of the counter 50 to select Frobenius Operator are relatively large, the output of counters 40,42,44 are mapped through the tables 46,48,50 respectively to provide values for row and column of the notional matrix and the order i of the Frobenius Operator to be applied.

The output of counter 48 selects a column of the array 54 from which a designation associated with a starting pair can be ascertained. In the example of FIG. 6, the output of counter 42 is mapped by table 48 to provide an output of 3, indicating that column 3 of array 54 should be selected. Similarly, the output of counter 40 is mapped through table 46 to provide a count of 3 indicating that values in row 3 of the matrix should be used.

The assigned designations for a particular row are then obtained by adding the row value to the values of the starting pair. This gives a new pair of assigned designations that indicate the locations of elements in set 52. The signing elements are then retrieved from the set 52.

One of those pairs of signing elements is then output to a shift register 22 and operated upon by the designated Frobenius Operator Ø. The value of the Frobenius Operation is obtained from the output of table 50 which maps counter 44. The value obtained from table 5 sets the shift clock associated with register 22 so that the contents of the register 22 are cyclically shifted to the Frobenius value Ø indicated by the output of table 50.

Accordingly, a new value for kP is obtained. The associated value of k can be computed as described above with the arithmetic unit utilizing the output of table 50 to determine the new value of $\lambda$. Accordingly, a derived value is obtained.

The derived value and signing element are then combined as described at (ii) above to provide a new session pair k, kP for use in the signing process.

The use of the counters 40,42 provides input values for the respective tables so that the array 54 is accessed in a deterministic but unpredictable fashion. The grouping of the pairs in the array 54 ensures there is no repetition in the selected elements to maintain the integrity of the signature scheme.

Counter 44 operates upon one of the selected pairs to modify it so that a different pair of values is presented for combination on each use, even though multiple access may be made to the array 54.

The counters 40,42,44 may also be utilized to limit the use of the Smart Card if desired so that a forced expiry will occur after a certain number of uses. Given the large number of possible signatures, this facility may be desirable.

Alternative structures to the look up tables 46,48,50 may be utilized, such as a linear feedback shift register, to achieve a mapped output if preferred.

In summary, therefore, pairs of signing elements from an initial set of stored values can be selected in a deterministic and unpredictable manner and one of those elements operated upon by the Frobenius Operator to provide additional values for the elements. The elements may then be combined to obtain a new session pair with a portion of the computation being performed off card but without disclosing the value of the elements. Accordingly, an extended group of session pairs is available for signing from a relatively small group of stored values.

We claim:

1. A method of generating a digital signature implemented over an elliptic curve for use in a public key cryptographic scheme utilizing information maintained secret in one computing device comprising the steps of:
   (i) initiating the computation of a coordinate of a point on the elliptic curve from a pair of other points on said curve by performing on said one device an initial set of steps in the computation to inhibit recognition of information pertaining to the identity of said other points,
   (ii) transferring to another computing device remote from the one device the results of said steps,
   (iii) performing additional steps in said computation at said other device, and
   (iv) transferring the result of said additional steps to said one device for incorporation in said signature.

2. A method according to claim 1 wherein said initial steps includes a field operation to combine information from each of said other points.

3. A method according to claim 2 wherein said combined information is utilized in said additional steps.

4. A method according to claim 3 wherein said field operation includes the summation of the information representing one coordinate of each of said other points and the summation of the information representing the other coordinate of each of the other points.

5. A method according to claim 4 wherein said information representing the summation of said coordinates is transferred from said one device to said other device.

6. A method according to claim 4 wherein said elliptic curve is over the finite field $2^m$ and represents said coordinates in a normal basis in said field.

7. A method according to claim 6 wherein said additional steps includes cyclically shifting said information representing the summation of said coordinates.

8. A method according to claim 1 wherein said additional steps complete said computation.

9. A method according to claim 1 wherein said computation generates a single coordinate of said point, said single coordinates being utilized in said signing.

10. A method of deriving a coordinate of a point on an anomalous elliptic curve over the field $GF2^m$ for utilization in a public key cryptographic scheme implemented over said curve, said method comprising the steps of
    (i) storing a normal basis representation of each of a set of coordinates of points on said curve,
    (ii) retrieving said normal basis representation of a coordinate of one of said points,
    (iii) performing an i-fold cyclic shift on said retrieved normal basis representation of said one coordinate, and
    (iv) utilizing the resultant representation as a coordinate of a further point on the curve resulting from an i-fold application of the Frobenuis Operator to said one said point.

11. A method according to claim 10 wherein each of said set of coordinates represents a point on the curve that is an integer multiple k, of a starting point P, and the i-fold application of the Frobenius Operation to said starting point P produces a new point $\emptyset^i p$ where $\emptyset^i p = \lambda p$, said method including the step of determining the integer k' associated with said further point by computing $k\lambda^i$.

12. A method of generating a session pair k, kp for use in a digital signature performed on an anomalous elliptic curve in the field $GF2^m$ where kP is a point on said curve resulting from the k fold addition of a starting point P where k is an integer, said method comprising the steps of
    (i) storing a set of initial values of k and kP, as a normal basis representation in the field $GF2^m$;
    (ii) selecting a coordinate of one of said points kP in said set of initial values;
    (iii) performing an i-fold cyclic shift on said coordinate to obtain a normal basis representation of the coordinate after an i-fold application of a Frobenius Operator;
    (iv) selecting the integer k associated with said one of said points;
    (v) computing an integer value $\lambda^i k$ where $\lambda$ defines the relationship between the start point P and a point $\emptyset P$ and $\emptyset$ indicates a Frobenius Operation;
    (vi) utilizing the resultant representation of the coordinate and the value $\lambda^i k$ as a session pair in a digital signature r,s where r is derived from the representation of a coordinate of a point on the curve and s is derived from the integer value associated with such point, the message to be signed and r.

* * * * *